US009389063B2

(12) United States Patent
Wong et al.

(10) Patent No.: US 9,389,063 B2
(45) Date of Patent: Jul. 12, 2016

(54) CHIP-SCALE INTERFEROMETRY FOR HYPERENTANGLEMENT PROCESSING

(71) Applicant: The Trustees of Columbia University in the City of New York, New York, NY (US)

(72) Inventors: Chee Wei Wong, Weehawken, NJ (US); Franco N. C. Wong, Lexington, MA (US); Dirk R. Englund, New York, NY (US)

(73) Assignee: The Trustees Of Columbia University In The City Of New York, New York, NY (US)

(*) Notice: Subject to any disclaimer, the term of this patent is extended or adjusted under 35 U.S.C. 154(b) by 0 days.

(21) Appl. No.: 14/245,638

(22) Filed: Apr. 4, 2014

(65) Prior Publication Data
US 2014/0218747 A1    Aug. 7, 2014

Related U.S. Application Data

(63) Continuation of application No. PCT/US2012/059109, filed on Oct. 5, 2012.

(60) Provisional application No. 61/543,508, filed on Oct. 5, 2011.

(51) Int. Cl.
| | |
|---|---|
| *G01B 9/02* | (2006.01) |
| *G02F 1/39* | (2006.01) |
| *G06N 99/00* | (2010.01) |
| *G02B 6/126* | (2006.01) |

(52) U.S. Cl.
CPC .. *G01B 9/02* (2013.01); *G02F 1/39* (2013.01); *G06N 99/002* (2013.01); *G02B 6/126* (2013.01); *Y10T 29/49* (2015.01)

(58) Field of Classification Search
CPC ............ G01B 9/02; G01B 6/126; G02F 1/39; G06N 99/002; Y10T 29/49
USPC .......................................................... 356/491
See application file for complete search history.

(56) References Cited

U.S. PATENT DOCUMENTS

| 2004/0145026 A1 | 7/2004 | Sun |
| 2008/0037996 A1 | 2/2008 | Spillane |
| 2008/0075410 A1 | 3/2008 | Spillane |
| 2009/0016386 A1 | 1/2009 | Edamatsu |
| 2010/0208334 A1 | 8/2010 | Kanter |

OTHER PUBLICATIONS

J. H. Shapiro and N. C. Wong, "An ultrabright narrowband source of polarizationentangled photon pairs," J. Opt. B: Quantum Semiclass. Opt. 2, L1 (2000).
T. Kim, M. Fiorentino, and F. N. C. Wong, "Phase-stable source of polarizationentangled photons using a polarization Sagnac interferometer," Phys. Rev. A 73, 012316 (2006).
F. N. C. Wong, J. H. Shapiro, and T. Kim, "Efficient generation of polarization-entangled photons in a nonlinear crystal," Laser Phys. 16, 1517 (2006).
International Search Report PCT/US12/059109.

*Primary Examiner* — Tarifur Chowdhury
*Assistant Examiner* — Jonathon Cook
(74) *Attorney, Agent, or Firm* — Attorneys Under Customer No. 26418

(57) ABSTRACT

An interferometer module for quantum processing is described including a substrate having two or more input ports and two or more output ports; multiple photonic pathways embedded in the substrate for conveying photons from the two or more input ports and the two or more output ports; and one or more partial beam splitters embedded in the substrate in a photonic pathway for generating spatial and polarization entanglement.

35 Claims, 10 Drawing Sheets

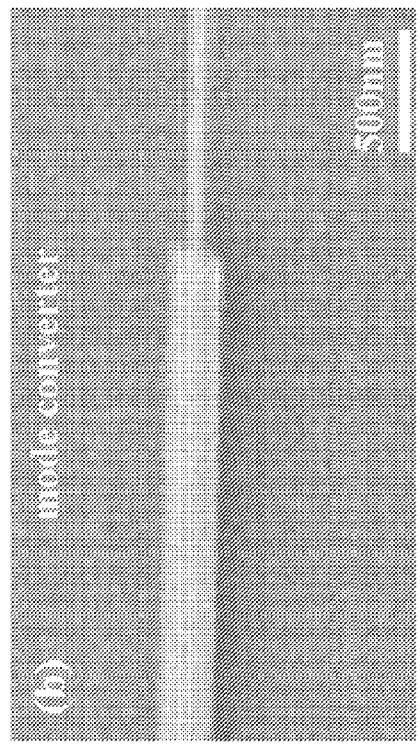
FIGURE 7(a)
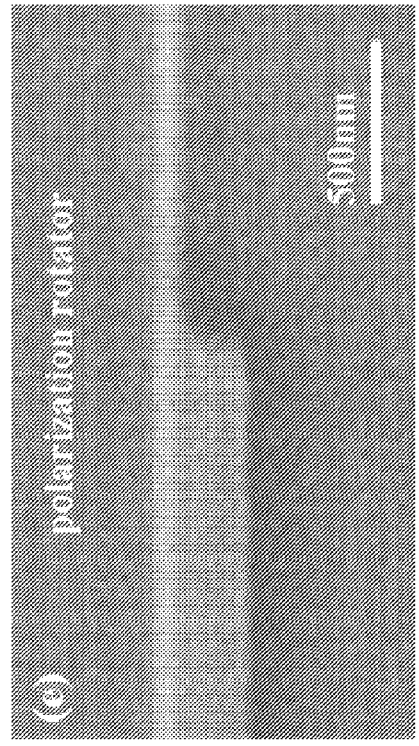
FIGURE 7(b)
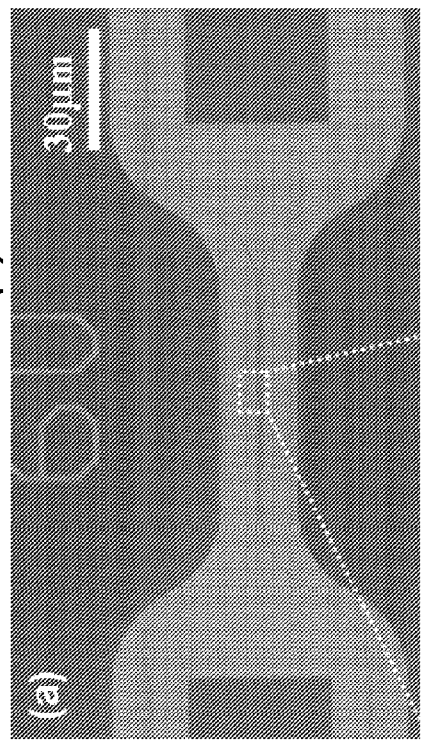
FIGURE 7(c)
FIGURE 7(d)
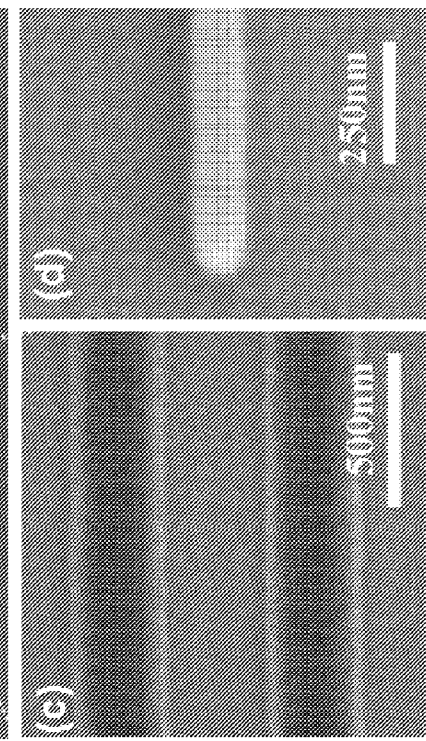
FIGURE 7(e)

CHIP-SCALE INTERFEROMETRY FOR HYPERENTANGLEMENT PROCESSING

CROSS-REFERENCE TO RELATED APPLICATIONS

This application is a Continuation of PCT/US12/59109, filed Oct. 5, 2012, which claims priority to U.S. Provisional patent application No. 61/543,508 filed Oct. 5, 2011, which are incorporated by reference in their entirety herein.

This invention was made with government support under Grant W911INF-10-1-0416 awarded by DARPA. The government has certain rights in the invention.

FIELD

An interferometer module for quantum processing is provided, including modules for generating and analyzing hyperentanglement on a photonic chip, between the polarization and spatial mode degrees of freedom.

BACKGROUND

Quantum computing is showing increasing promise. One of the main issues is that of entanglement. Being able to entangle photons has long been thought a necessity of quantum computing. In the nonlinear-optical process of spontaneous parametric down-conversion (SPDC), in which a laser beam illuminates a nonlinear-optical crystal, pairs of photons are generated in a state that can be entangled concurrently in polarization and in spatial modes.

Currently, interferometers which generate spatial entanglement in free space encounter significant disadvantages. For example, path length stability is a concern. Interferometric manipulations for the spatial modes are effectively a large web of interference paths whose phases are difficult to maintain stably in free space.

Accordingly, there is a need in the art for chip-scale interferometers which enable the generation and analysis of hyperentanglement which are phase stable.

SUMMARY

An interferometer module for quantum processing is provided including a substrate comprising two or more input ports and two or more output ports; multiple photonic pathways embedded in the substrate for conveying photons from the two or more input ports and the two or more output ports; and one or more partial beam splitters embedded in the substrate in a photonic pathway for generating spatial and polarization entanglement.

In some embodiments, the module includes a halfwave plate embedded in the substrate in a photonic pathway for rotating polarization by 45 degrees. In some embodiments, the halfwave plate is a polarization rotator fabricated on the substrate.

In some embodiments, the partial beam splitter is 50/50 beam splitter. In some embodiments, the partial beam splitter is a coupling region fabricated on the substrate.

In some embodiments, the module is a hyperentanglement generation module. The module can further include two spatially entangled photon sources and a partial beam splitter for orthogonally polarizing the outputs of the spatially entangled photon sources. The multiple photonic pathways can define at least one interference crossing.

In some embodiments, the module is a hyperentanglement analysis module. The input ports can include a signal photon input. The partial beam splitter can include a 50/50 beam splitter for polarization analysis along the (H, V) basis and the (H+V, H−V) basis. The partial beam splitter can include a 50/50 beam splitter to randomly select the spatial mode analysis basis.

In some embodiments, the interferometer module further includes two detectors to determine the (T, B) basis of the spatial mode analysis. In some embodiments, the interferometer module further includes a 50/50 beam splitter to mix two T and B spatial modes to generate T+B and T−B states to determine the (T+B, T−B) basis of the spatial mode analysis.

In some embodiments, the substrate has a maximum dimension of 10 centimeters or less and is fabricated on one or more semiconductor wafers. The substrate can be fabricated from integrated photonic semiconductor materials. The photonic pathway can be fabricated from integrated photonic semiconductor materials through lithography or pattern transfer processes.

A method for fabricating an interferometer module for quantum processing is disclosed including providing a substrate comprising two or more input ports and two or more output ports; providing multiple photonic pathways embedded in the substrate for conveying photons from the two or more input ports and the two or more output ports; and providing one or more partial beam splitters embedded in the substrate in a photonic pathway for generating spatial and polarization entanglement.

In some embodiments, the method further includes providing a halfwave plate embedded in the substrate in a photonic pathway for rotating polarization by 45 degrees. Providing the halfwave plate can include providing a polarization rotator fabricated on the substrate.

In some embodiments, providing the partial beam splitter includes providing a 50/50 beam splitter. Providing the partial beam splitter can include providing a coupling region fabricated on the substrate.

In some embodiments, the method includes fabricating a hyperentanglement generation module. The method can further include providing two spatially entangled photon sources and a partial beam splitter for orthogonally polarizing the outputs of the spatially entangled photon sources. Providing the multiple photonic pathways can include defining at least one interference crossing.

In some embodiments, the method includes fabricating a hyperentanglement analysis module. Providing an input port can include providing a signal photon input. Providing the partial beam splitter can include providing a 50/50 beam splitter for polarization analysis along the (H, V) basis and the (H+V, H−V) basis. Providing the partial beam splitter can include providing a 50/50 beam splitter to randomly select the spatial mode analysis basis.

In some embodiments, the method further includes providing two detectors to determine the (T, B) basis of the spatial mode analysis. In some embodiments, the method further includes providing a 50/50 beam splitter to mix two T and B spatial modes to generate T+B and T−B states to determine the (T+B, T−B) basis of the spatial mode analysis.

In some embodiments, providing the substrate includes providing a substrate having a maximum dimension of 10 centimeters or less, and fabricating on one or more semiconductor wafers. The substrate can be fabricated from integrated photonic semiconductor materials. The photonic pathway can be fabricated from integrated photonic semiconductor materials through lithography or pattern transfer processes.

BRIEF DESCRIPTION OF THE DRAWINGS

FIG. 7(a) is a scanning electron microscope view of a directional coupler in accordance an exemplary embodiment of the disclosed subject matter.

FIG. 7(b) is a scanning electron microscope view of a mode converter in accordance an exemplary embodiment of the disclosed subject matter.

FIG. 7(c) is an enlarged view of the mode converter of FIG. 7(b).

FIG. 7(d) is a scanning electron microscope view of an inverse taper tip in accordance an exemplary embodiment of the disclosed subject matter.

FIG. 7(e) is a scanning electron microscope view of a polarization rotator in accordance an exemplary embodiment of the disclosed subject matter.

DETAILED DESCRIPTION OF EXEMPLARY EMBODIMENTS

Figure 1:
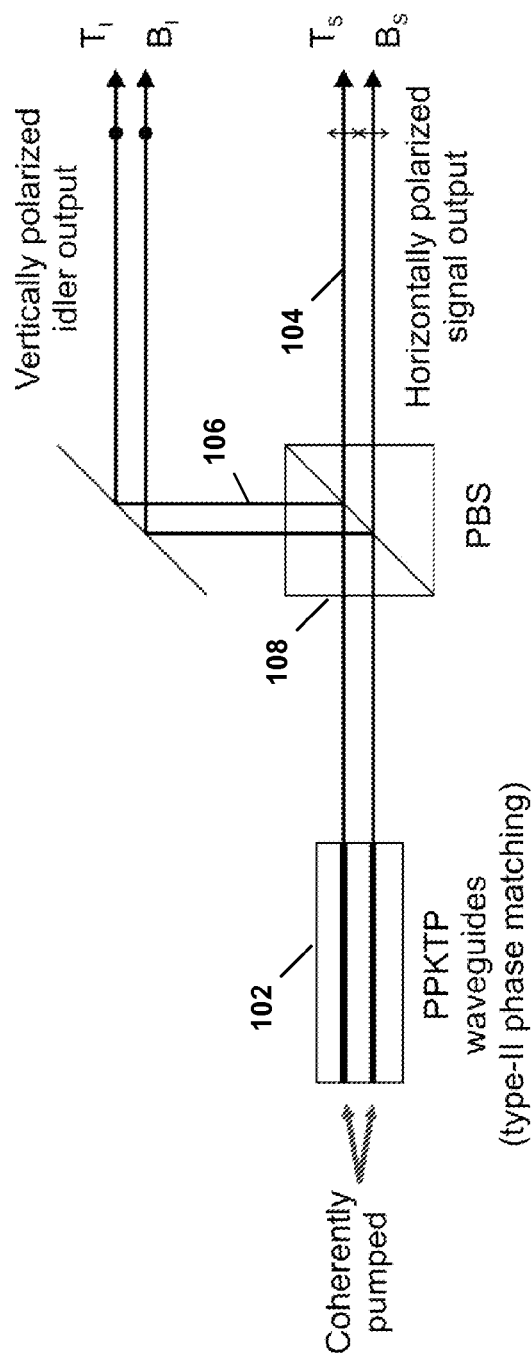
FIG. 1 is a schematic view of apparatus for generation of spatial entanglement using PPKTP waveguide downconverters in accordance an exemplary embodiment of the disclosed subject matter.

It is understood that the subject matter described herein is not limited to particular embodiments described, as such may, of course, vary. It is also understood that the terminology used herein is for the purpose of describing particular embodiments only, and is not intended to be limiting, since the scope of the present subject matter is limited only by the appended claims. Where a range of values is provided, it is understood that each intervening value between the upper and lower limit of that range, and any other stated or intervening value in that stated range, is encompassed within the disclosed subject matter.

Unless defined otherwise, all technical and scientific terms used herein have the same meaning as commonly understood by one of ordinary skill in the art to which this disclosed subject matter belongs. Although any methods and materials similar or equivalent to those described herein can also be used in the practice or testing of the present disclosed subject matter, this disclosure may specifically mention certain exemplary methods and materials.

All publications mentioned in this disclosure are, unless otherwise specified, incorporated by reference herein for all purposes, including, without limitation, to disclose and describe the methods and/or materials in connection with which the publications are cited.

The publications discussed herein are provided solely for their disclosure prior to the filing date of the present application. Nothing herein is to be construed as an admission that the present disclosed subject matter is not entitled to antedate such publication by virtue of prior invention. Further, the dates of publication provided may be different from the actual publication dates, which may need to be independently confirmed.

As used herein and in the appended claims, the singular forms "a," "an" and "the" include plural referents unless the context clearly dictates otherwise.

Nothing contained in the Abstract or the Summary should be understood as limiting the scope of the disclosure. The Abstract and the Summary are provided for bibliographic and convenience purposes and due to their formats and purposes should not be considered comprehensive.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosed subject matter. Any recited method can be carried out in the order of events recited, or in any other order that is logically possible.

Reference to a singular item includes the possibility that there are plural of the same item present. When two or more items (for example, elements or processes) are referenced by an alternative "or," this indicates that either could be present separately or any combination of them could be present together, except where the presence of one necessarily excludes the other or others.

As summarized above and as described in further detail below, in accordance with the various embodiments of the present invention, there is provided a chip-scale interferometer for generating and/or analyzing hyperentanglement or other quantum processes.

In some embodiments, spatial entanglement can be generated, e.g., using two type-II phase-matched periodically poled potassium titanyl phosphate (PPKTP) waveguides, as shown in FIG. 1. In the exemplary embodiment, two nearly identical PPKTP waveguides 102 are coherently driven by a pump laser (not shown). The waveguides 102 can be individually temperature tuned to yield the same center wavelength for the spontaneous parametric downconversion (SPDC) outputs, and the pump power for each waveguide can be adjusted to yield the same pair generation rate. Type-II phase matching generates signal and idler photons with horizontal (H) polarizations 104 and vertical (V) polarizations 106, respectively, that can be easily separated with a polarizing beam splitter (PBS) 108. The waveguides are weakly pumped so that the pair generation probability is much less than unity per measurement time interval. For example, for a 40-ps time interval, the generation rate should be ~1% to ensure high quantum interference visibility. It is understood that there is only one pair of generated signal-idler photons, and the probability of two or more pairs is low and is ignored in this discussion.

The positions of the two waveguides form a natural basis for the spatial entanglement: top (T) or bottom (B). Because the two waveguides are coherently driven, the spatially entangled output must be a coherent superposition of the two possible terms as illustrated in equation (1) below:

$$|\Psi\rangle = |T_S T_I + B_S B_I\rangle / \sqrt{2} \qquad (1)$$

In some embodiments, realization of spatial entanglement can be simplified by using a single waveguide instead of two nearly identical waveguides. In some embodiments, the single waveguide is then pumped bidirectionally such that the two downconverters are distinguished by their propagation directions. They can then be combined to generate the desired entangled state.

The two-waveguide configuration for generating spatial entanglement can be generalized to create hyperentangled photon pairs with additional entanglement in other degrees of freedom, including polarization and more spatial modes.

Figure 2:
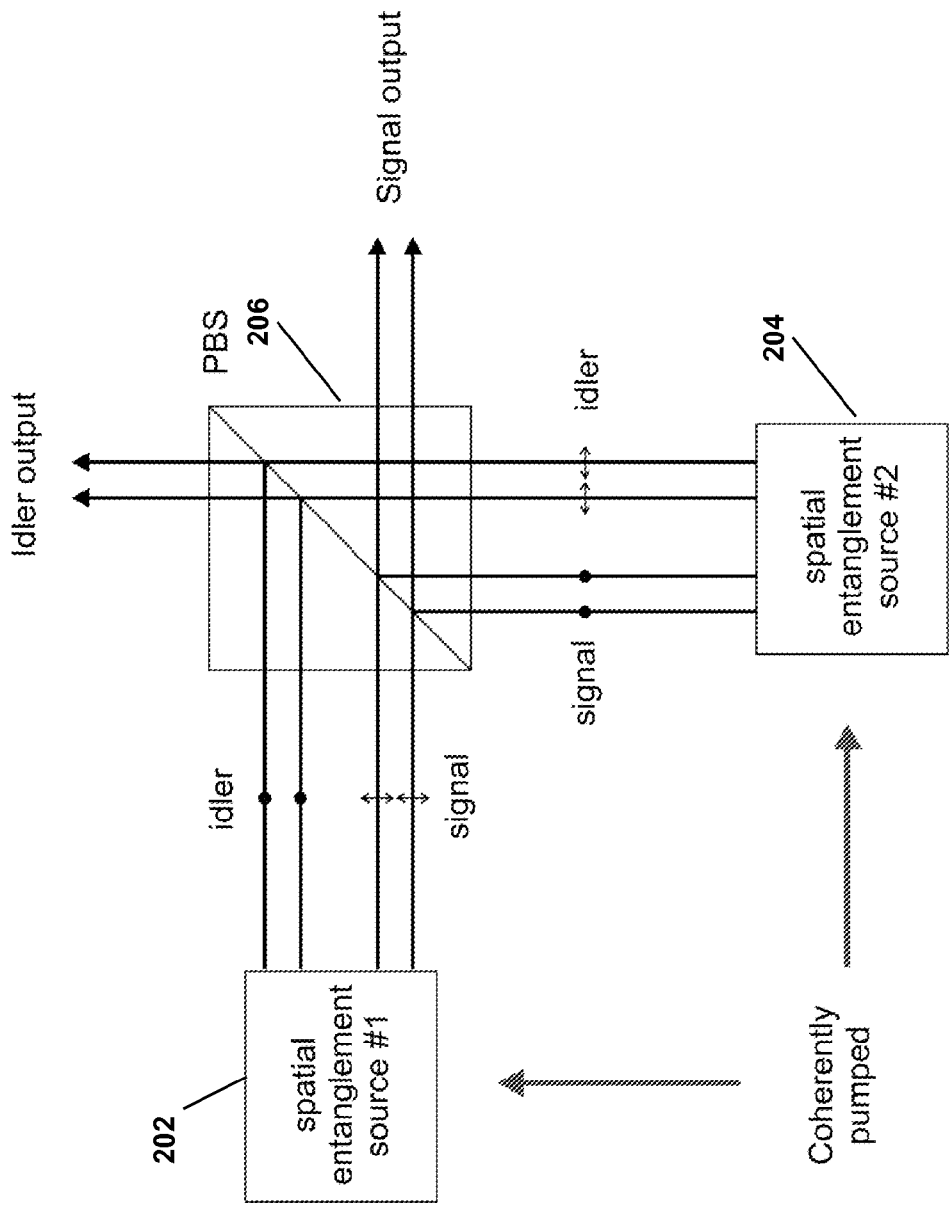
FIG. 2 is a schematic view of apparatus for generation of spatial-polarization hyperentanglement using two spatially entangled sources of FIG. 1 in accordance an exemplary embodiment of the disclosed subject matter.

The spatial-polarization hyperentanglement generation is shown in FIG. 2. The two identical spatially entangled-photon sources are illustrated in FIG. 1, described above. FIG. 2 illustrates spatial entanglement source #1 202 that generates idler and signal output, spatial entanglement source #2 204 that generates idler and signal output, and polarizing beam splitter (PBS) 206. The output polarizations of source #2 204 of FIG. 2 are rotated by 90 degrees so that the inputs from the two sources to the PBS 206 are orthogonally polarized for the signal and for the idler.

Once the signal and idler photons are separated, the spatial positions T and B for signal and idler can be relabeled. The hyperentangled photon-pair output state of FIG. 2 is given by equation (2):

$$|\Psi\rangle = |(T_S B_I + B_S T_I)(H_S V_I + V_S H_I)\rangle / 2 \qquad (2)$$

The spatial degree of freedom does not need to be two distinct $TEM_{00}$ modes. The two modes can be two orthogonal Laguerre-Gaussian modes, e.g., as long as lossless separation/combination of the modes is implemented. The exemplary scheme in FIGS. 1 and 2 is preserves the very high generation efficiency of standard (single-mode) PPKTP waveguides.

Figure 3A:
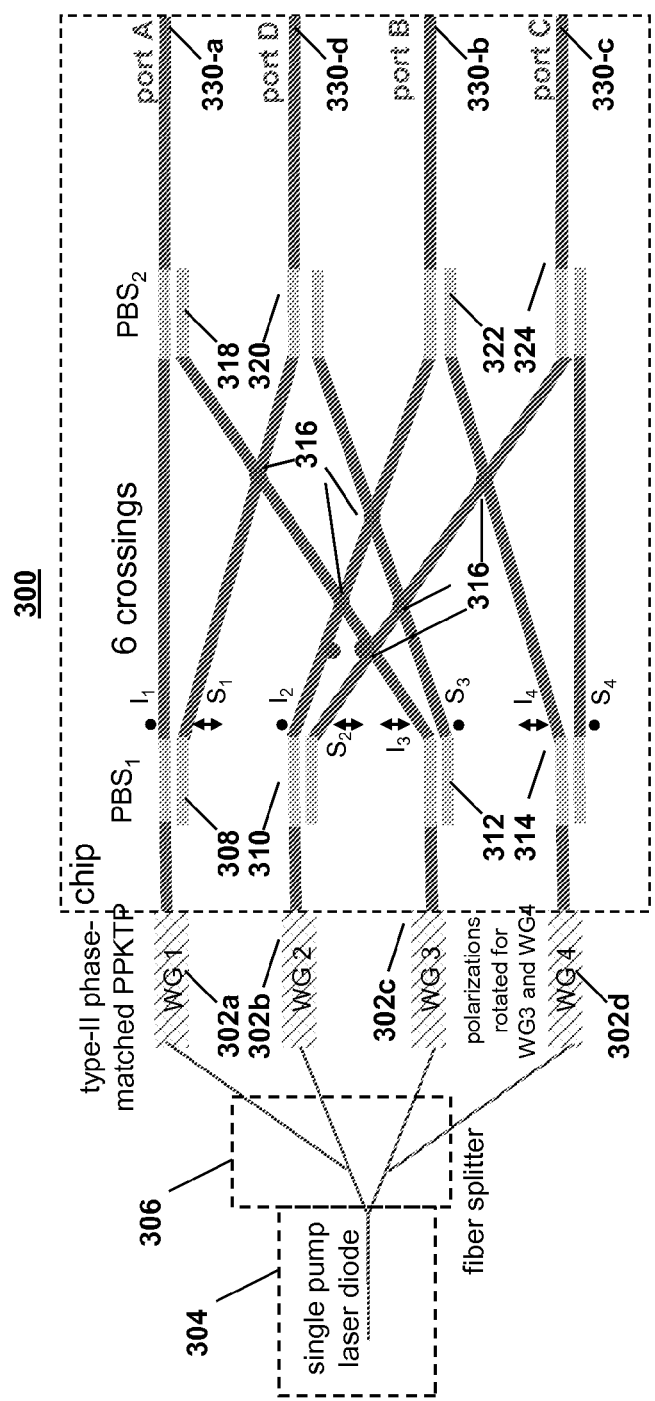
FIG. 3(a) is a schematic view of a polarization-spatial mode hyperentanglement generation photonic chip in accordance an exemplary embodiment of the disclosed subject matter.

A chip-scale photonic implementation of the hyperentanglement generation module has been designed as illustrated in FIG. 3(a) and designated module 300. The module 300 includes 4 inputs WG1 302a, WG2 302b, WG3 302c, and WG4 302d generated, e.g., by a single pump laser diode 304 and a fiber splitter 306. Polarizations are rotated for WG3 and WG4. The input provided to module 300 corresponds to the output of spatial entanglement source #1 (202) and source #2 (204) illustrated in FIG. 2. Polarizing beam splitters $PBS_1$ 308, 310, 312, and 314 are provided, creating multiple light paths resulting in 6 crossing 316. Another set of polarizing beam splitters PBS2 318, 320, 322, and 324 combine the outputs of PBS1 and crossings. Output is provided at port A 330-a, port B 330-b, port C 330-c and port D 330-d.

Figure 3B:
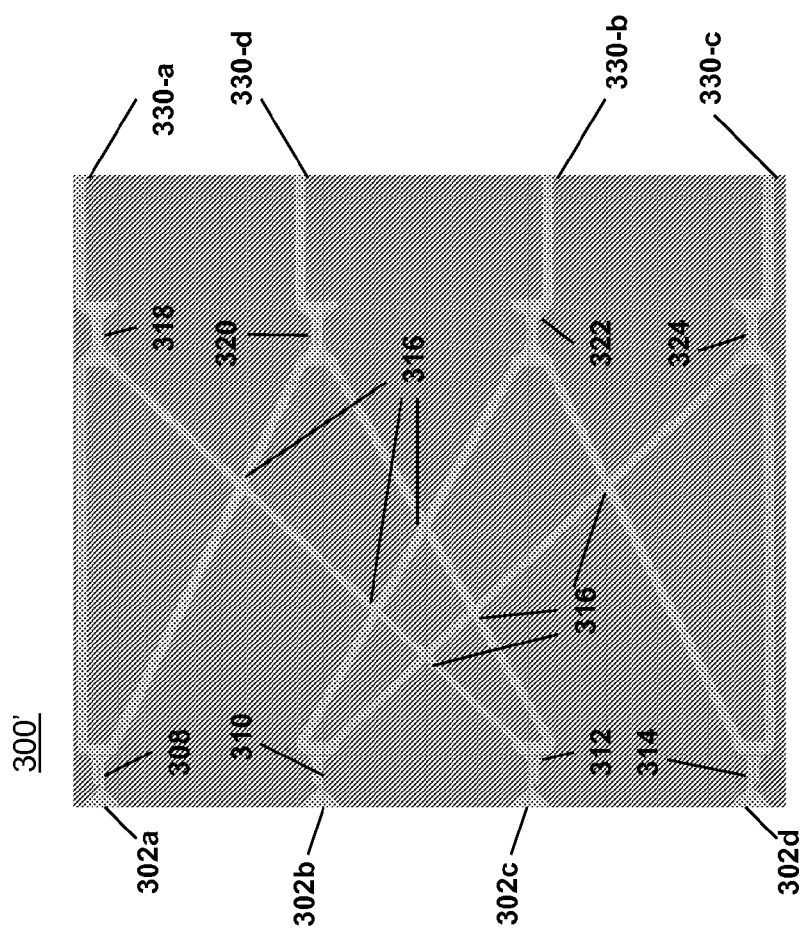
FIG. 3(b) is an optical image of a polarization-spatial mode hyperentanglement generation photonic chip in accordance an exemplary embodiment of the disclosed subject matter.

An electron-beam nanofabricated chip-scale implementation hyperentanglement generation module is shown in FIG. 3(b) and designated module 300'. Accordingly all input ports, polarizing beam splitters, crossings, and output ports are contained on a single chip. The composition of the module and the light paths, polarizing beam splitters and crossings techniques are implemented by tracing the light paths in free-space and translating that into the chip implementation. The module typically includes a substrate which is "chip-scale," e.g., 10 centimeters or less in length and fabricated on semiconductor wafers. In some embodiments, the substrate is fabricated from integrated photonic semiconductor materials. In some embodiments, the photonic pathway is fabricated from integrated photonic semiconductor materials through lithography or pattern transfer processes.

The hyperentangled photon pair must be analyzed appropriately by the receivers (e.g., Alice and Bob) to verify the security of a QKD network. For spatial-polarization hyperentangled photons, it is possible to analyze both degrees of freedom simultaneously. There should be two mutually unbiased bases for each degree of freedom. In polarization, it is conventionally analyzed in (H, V) and (H+V, H−V) bases. For spatial modes, one can therefore choose between (T, B) and (T+B, T−B).

Figure 4A:
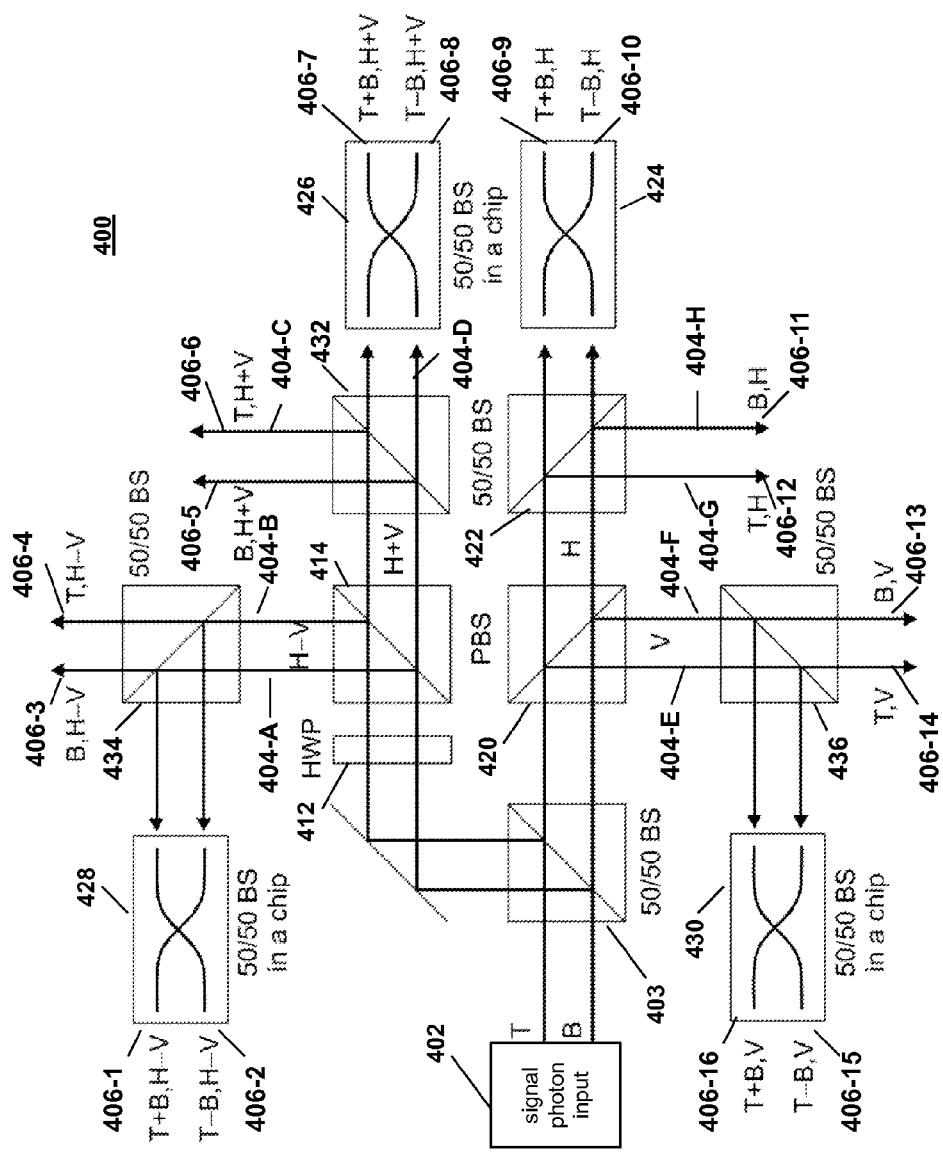
FIG. 4(a) is a schematic view of a spatial-polarization hyperentanglement analysis apparatus a in accordance an exemplary embodiment of the disclosed subject matter.
Figure 4B:
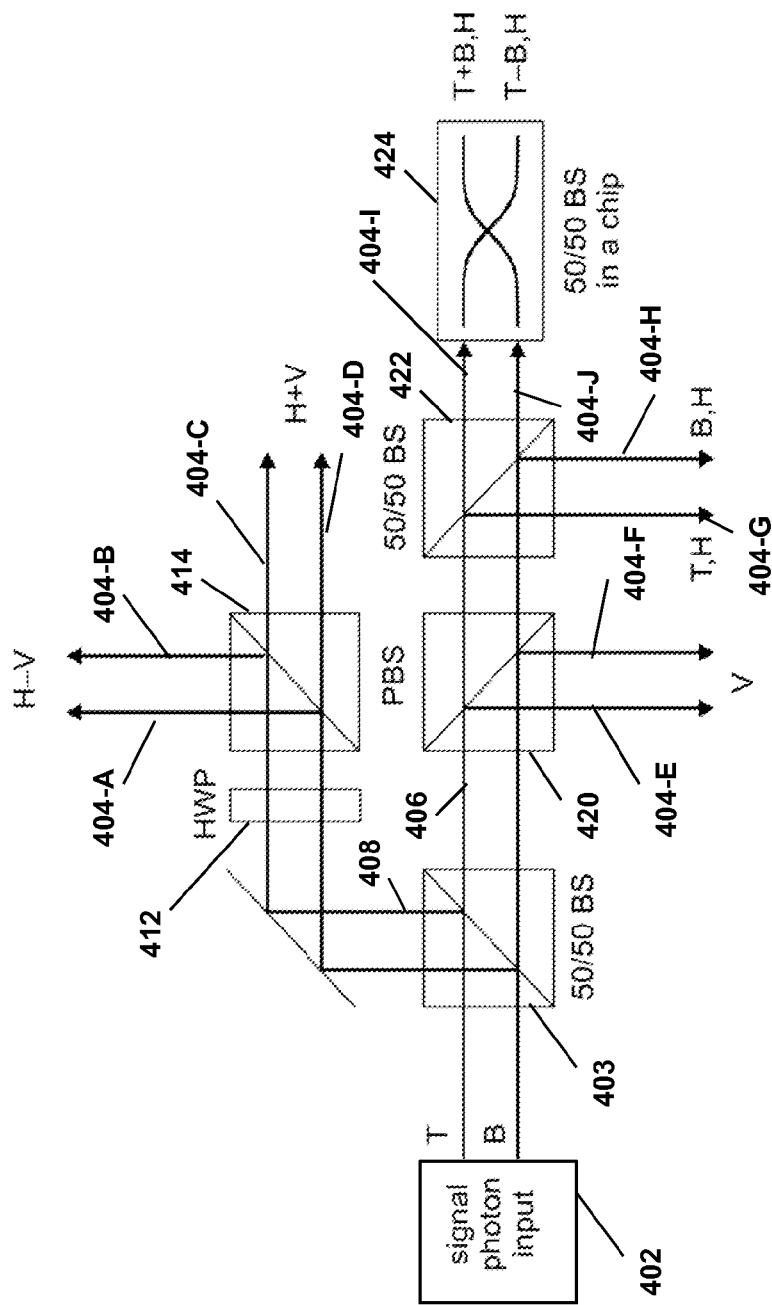
FIG. 4(b) is an enlarged view of a portion of the apparatus illustrated in FIG. 4(a).

FIGS. 4(a) and 4(b) illustrate a schematic of the linear-optics analyzer designated analyzer module 400. FIG. 4(a) shows the complete spatial-polarization hyperentanglement analysis module 400. A single photon input 402 is represented along with outputs ports, port 1 406-1, port 2 406-2, port 3 406-3, . . . port 16 406-16.

FIG. 4(b) shows an enlarged view of a portion of module 400 represented in FIG. 4(a). In FIG. 4(b), the first 50/50 beam splitter (BS) 403 randomly sends the photon for polarization analysis along the (H, V) basis in the lower arm 406, and the (H+V, H−V) basis in the upper arm 408, in which a half-wave plate (HWP) 412 rotates the polarization by 45 degrees for analysis with a standard PBS 414 (port A 404-A, port B 404-B, port C 404-C, port D 404-D).

FIG. 4(b) further shows the details of the spatial mode analysis following the PBS polarization analysis of the lower arm 406. After transmission through the PBS 420, the polarization is determined to be H, regardless of whether the spatial bit is T or B. Another 50/50 BS 422 is used to randomly select the spatial mode analysis basis: either (T, B) (port G 404-G or port H 404-H) or (T+B, T−B) (port I 404-I or port J 404-J). For (T, B) analysis, two detectors are used to determine T or B. If one of them clicks, it implies a polarization bit of H and a spatial bit of either T or B, depending on which detector clicks. To measure in the (T+B, T−B) basis, a 50/50 BS in a photonic chip 424 is used to mix the two T and B spatial modes to generate T+B and T−B states (port 9 406-9 and port 10 406-10), as long as the relative path lengths are correctly and stably maintained.

The path length stability therefore favors the use of a photonic chip instead of implementation in free space. Again, a detector click indicates the correct spatial mode and the H polarization bit. The same arrangement should be present for the other arms so that both polarization and spatial bits can be properly measured.

Figure 5A:
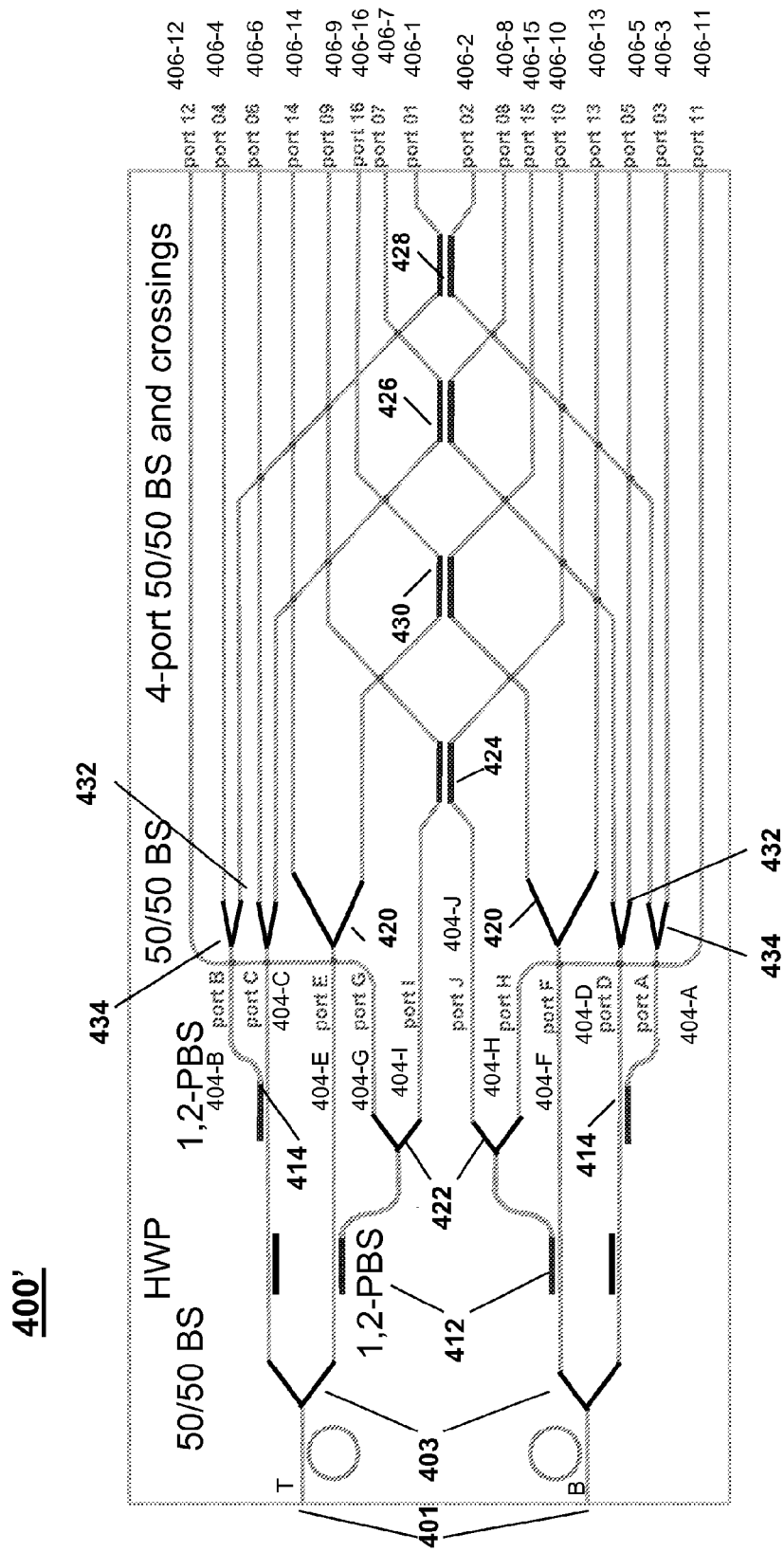
FIG. 5(a) is a schematic view of a polarization-spatial mode hyperentanglement analysis photonic chip in accordance an exemplary embodiment of the disclosed subject matter.
Figure 5B:
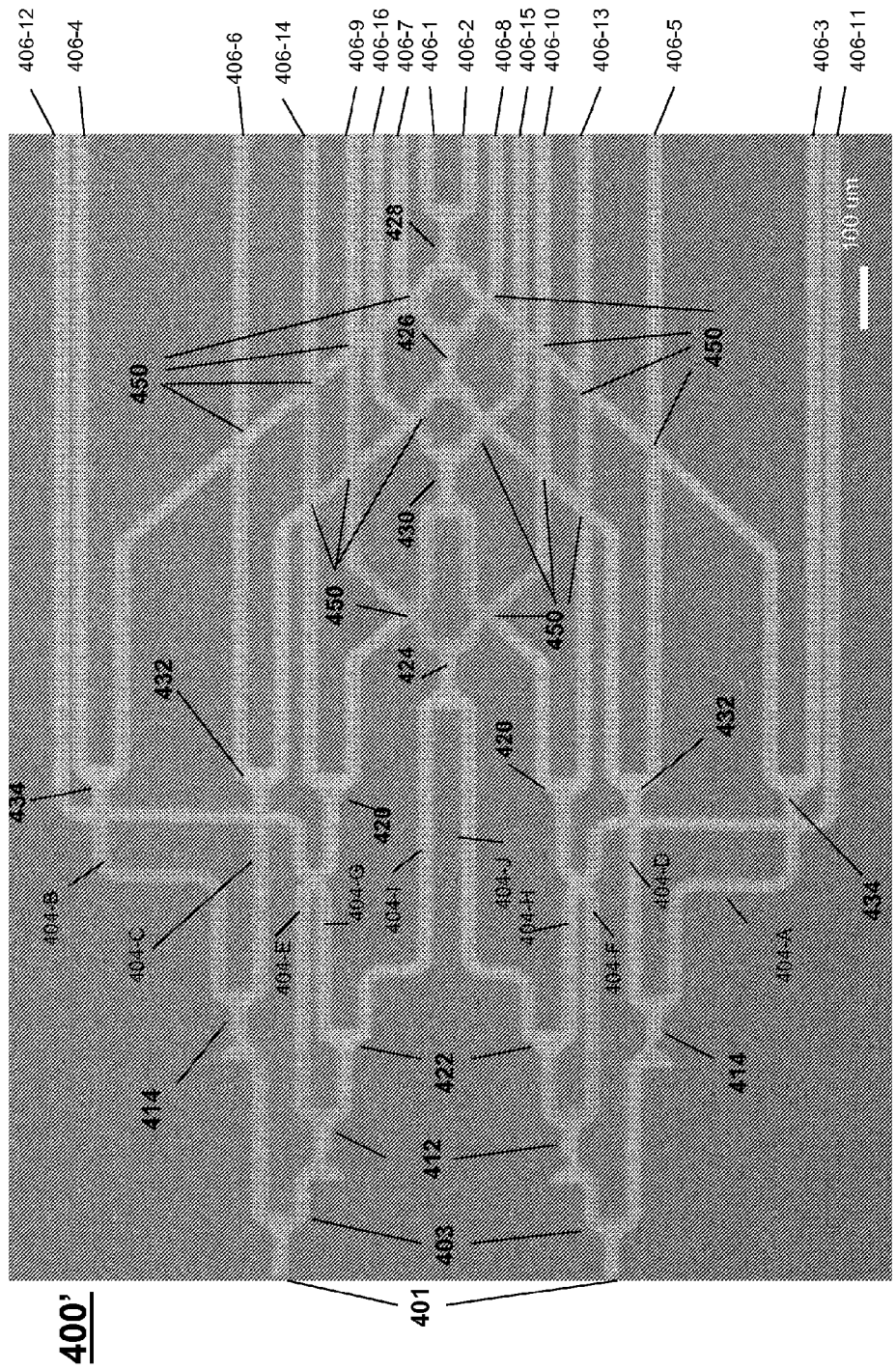
FIG. 5(b) is a scanning electron microscope view of a polarization-spatial mode hyperentanglement analysis photonic chip in accordance an exemplary embodiment of the disclosed subject matter.

A chip-scale photonic implementation of the hyperentanglement analysis module has been designed as illustrated in FIG. 5(a) and designated module 500'. An electron-beam nanofabricated sample of module 500' is shown in FIG. 5(b). [The composition of the module and the light paths, polarizing beam splitters and crossings techniques are implemented by tracing the light paths in free-space and translating that into the chip implementation. A plurality of interference paths are indicated with crossings denoted by reference number 450.

Chip-scale SWAP gate allows the implementation of single-qubit rotations in the degree of freedom that is most convenient. Interferometric manipulations for the spatial modes are effectively a large web of interference paths whose phases are difficult to maintain stably in free space, but can be maintained stably in photonic chips. For example, when operating in both free space and waveguides, and dealing with both polarization and spatial modes in two mutually unbiased bases, it is useful to have the capability of the SWAP gate to optimize the implementation of hyperentanglement analysis.

Figure 6:
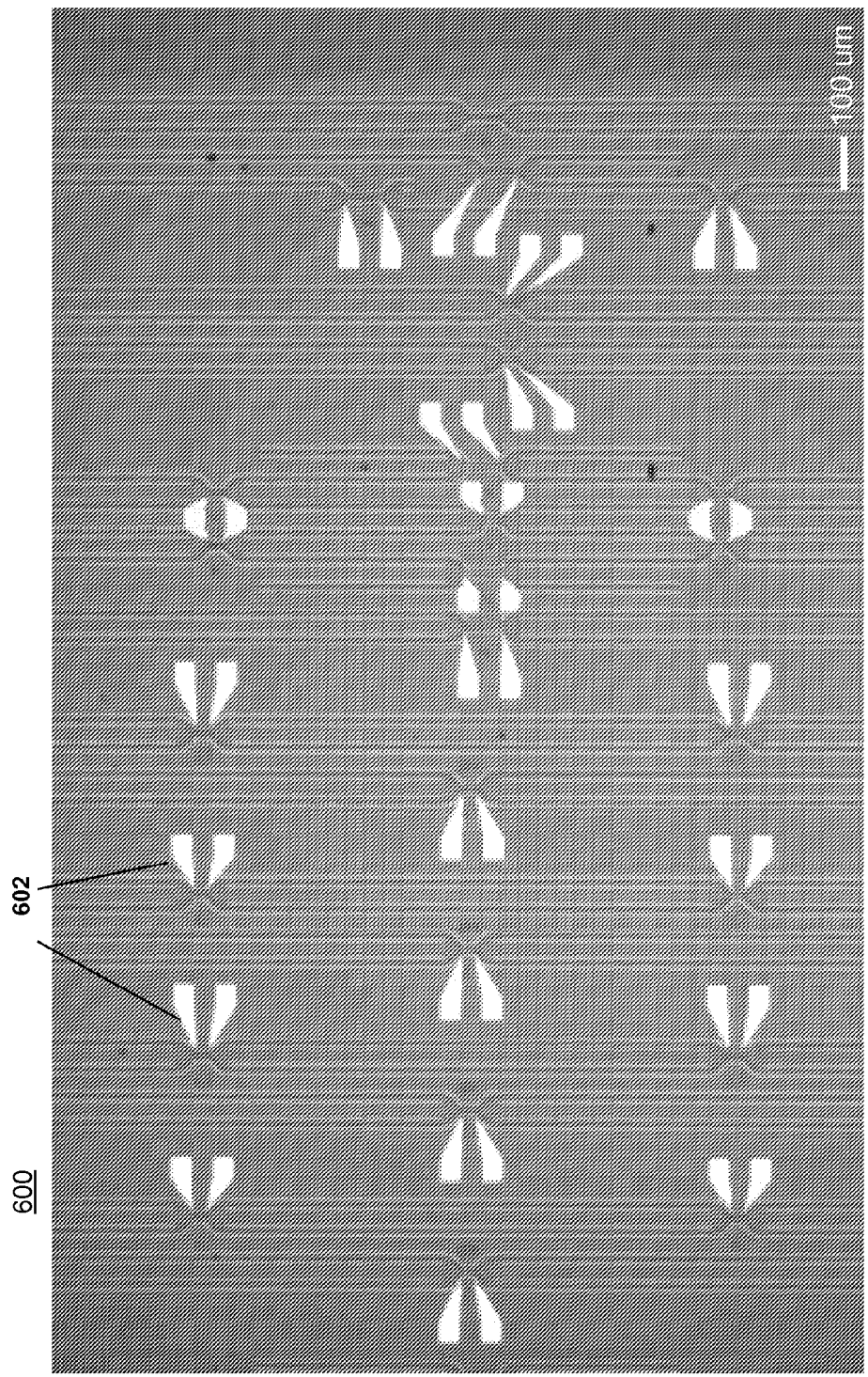
FIG. 6 is a scanning electron microscope view of a tunable photonic chip in accordance an exemplary embodiment of the disclosed subject matter.

The designed and fabricated SWAP module allows the quantum transduction from spatial to the polarization degrees-of-freedom and vice versa, permitting ease of detection. An example of a completed chip 600 is shown in FIG. 6. Tunable photonic chip 600 for single and correlated photons, with different variations. The "butterfly" regions 602 are the electrode contact pads for thermal tuning of the intensity ratios. Thermal turning works by tuning the refractive index of the silicon waveguides.

The key elements of the chip-scale SWAP gate—such as the polarization-controlled NOT gate and the momentum-controlled NOT gate illustrated in FIGS. 7(a)-(e) are the components for the hyperentanglement modules shown in FIGS. 3(a)-(b) and 5(a)-(b). For example, FIG. 7a is one illustration of the polarization-controlled-NOT gate (with sub-parts in 7(c) and 7(d)). Figure b and e are the two key components for the momentum-controlled-NOT gate. Therefore the integrated polarizing beam splitter, 50/50 splitter and half wave plate (FIGS. 4(a) and (b)), the modules discussed here can be fully integrated with the advantage of being more stable and scalable.

FIGS. 7(a)-(e) illustrate versions of the components in the hyperentanglement modules that are integrated into the photonic chip. For example, FIG. 7(a) illustrates directional coupler as an integrated version of beam splitter. In FIG. 7(b), a mode converter changes the size of the mode without changing the polarization. FIG. 7(c) illustrates an enlarged version of the coupling region in FIG. 7(a), by changing the coupling length, waveguide width and gap between two waveguides, any splitting ratio (50/50, polarization beam splitter for example) can be obtained. FIG. 7(d) illustrates an inverse taper tip that improves the efficiency of the coupling between the free space and chip. FIG. 7(e) illustrates a polarization rotator that rotates the polarization by 90 degrees and is the equivalent of the half wave plate in the hyperentanglement modules.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosed subject matter

What is claimed is:

1. An interferometer module for quantum processing comprising:
   a substrate comprising two or more input ports and two or more output ports;
   multiple photonic pathways embedded in the substrate for conveying photons from the two or more input ports and the two or more output ports;
   two spatially entangled photon sources and one or more partial beam splitters for orthogonally polarizing the outputs of the spatially entangled photon sources wherein the one or more partial beam splitters is embedded in the substrate in a photonic pathway for generating spatial and polarization entanglement, and further wherein the module is a hyperentanglement generation module.

2. The interferometer module of claim 1, further comprising a halfwave plate embedded in the substrate in a photonic pathway for rotating polarization by 45 degrees.

3. The interferometer module of claim 2, wherein the halfwave plate is a polarization rotator fabricated on the substrate.

4. The interferometer module of claim 1, wherein one or more partial beam splitters is 50/50 beam splitter.

5. The interferometer module of claim 1, wherein the partial beam splitter is a coupling region fabricated on the substrate.

6. The interferometer module of claim 1, wherein the multiple photonic pathways define at least one interference crossing.

7. The interferometer module of claim 1, wherein the module is a hyperentanglement analysis module.

8. The interferometer module of claim 7, wherein the input ports comprise a signal photon input.

9. The interferometer module of claim 7 wherein the partial beam splitter comprises a 50/50 beam splitter for polarization analysis along the (H, V) basis and the (H+V, H−V) basis.

10. The interferometer module of claim 7, wherein the partial beam splitter comprises a 50/50 beam splitter to randomly select the spatial mode analysis basis.

11. The interferometer module of claim 10, further comprising two detectors to determine the (T, B) basis of the spatial mode analysis.

12. The interferometer module of claim 10, further comprising a 50/50 beam splitter to mix two T and B spatial modes to generate T+B and T−B states to determine the (T+B, T−B) basis of the spatial mode analysis.

13. The interferometer module of claim 1, wherein the substrate has a maximum dimension of 10 centimeters or less in length and is fabricated on one or more semiconductor wafers.

14. The interferometer module of claim 1, wherein the substrate is fabricated from integrated photonic semiconductor materials.

15. The interferometer module of claim 1, wherein the photonic pathway is fabricated from integrated photonic semiconductor materials through lithography or pattern transfer processes.

16. A method for fabricating an interferometer module for quantum processing comprising:
   providing a substrate comprising two or more input ports and two or more output ports;
   providing multiple photonic pathways embedded in the substrate for conveying photons from the two or more input ports and the two or more output ports;
   providing one or more partial beam splitters embedded in the substrate in a photonic pathway for generating spatial and polarization entanglement; and
   providing two spatially entangled photon sources and a partial beam splitter for orthogonally polarizing the outputs of the spatially entangled photon sources, wherein the module is a hyperentanglement generation module.

17. The method of claim 16, further comprising providing a halfwave plate embedded in the substrate in a photonic pathway for rotating polarization by 45 degrees.

18. The method of claim 17, wherein providing the halfwave plate comprises providing a polarization rotator fabricated on the substrate.

19. The method of claim 16, wherein providing the partial beam splitter comprises providing a 50/50 beam splitter.

20. The method of claim 19, wherein providing the partial beam splitter comprises providing a coupling region fabricated on the substrate.

21. The method of claim 16, wherein providing the multiple photonic pathways comprises defining at least one interference crossing.

22. The method of claim 16, wherein the module is a hyperentanglement analysis module.

23. The method of claim 22, wherein providing an input port comprises providing a signal photon input.

24. The method of claim 22, wherein providing the partial beam splitter comprises providing a 50/50 beam splitter for polarization analysis along the (H, V) basis and the (H+V, H−V) basis.

25. The method of claim 22, wherein providing the partial beam splitter comprises providing a 50/50 beam splitter to randomly select the spatial mode analysis basis.

26. The method of claim 22, further comprising providing two detectors to determine the (T, B) basis of the spatial mode analysis.

27. The method of claim 22, further comprising providing a 50/50 beam splitter to mix two T and B spatial modes to generate T+B and T−B states to determine the (T+B, T−B) basis of the spatial mode analysis.

28. The method of claim 16, wherein providing the substrate comprises providing the substrate having a dimension of 10 centimeters or less and fabricated on one or more semiconductor wafer.

29. The method of claim 16, wherein providing the substrate comprises providing the substrate fabricated from integrated photonic semiconductor materials.

30. The method of claim 16, wherein providing the photonic pathway comprises providing photonic pathways fabricated from integrated photonic semiconductor materials through lithography or pattern transfer processes.

31. An interferometer module for quantum processing comprising:
   a substrate comprising two or more input ports and two or more output ports;
   multiple photonic pathways embedded in the substrate for conveying photons from the two or more input ports and the two or more output ports;
   a partial beam splitters embedded in the substrate in a photonic pathway for generating spatial and polarization entanglement, wherein the partial beam splitters comprises a 50/50 beam splitter to randomly select the spatial mode analysis basis; and
   two detectors to determine the (T, B) basis of the spatial mode analysis, wherein the module is a hyperentanglement analysis module.

32. The interferometer module of claim 31, wherein the 50/50 beam splitter is configured to mix two T and B spatial modes to generate T+B and T−B states to determine the (T+B, T−B) basis of the spatial mode analysis.

33. The interferometer module of claim 31, wherein the substrate has a maximum dimension of 10 centimeters or less in length and is fabricated on one or more semiconductor wafers.

34. The interferometer module of claim 31, wherein the substrate is fabricated from integrated photonic semiconductor materials.

35. The interferometer module of claim 31, wherein the photonic pathway is fabricated from integrated photonic semiconductor materials through lithography or pattern transfer processes.

* * * * *